(12) United States Patent
Wüstenberg

(10) Patent No.: US 11,313,441 B2
(45) Date of Patent: Apr. 26, 2022

(54) PLANETARY GEARBOX AND METHOD FOR ASSEMBLING A PLANETARY GEARBOX

(71) Applicant: Rolls-Royce Deutschland Ltd & Co KG, Blankenfelde-Mahlow (DE)

(72) Inventor: Hannes Wüstenberg, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 250 days.

(21) Appl. No.: 16/723,194

(22) Filed: Dec. 20, 2019

(65) Prior Publication Data

US 2020/0200236 A1 Jun. 25, 2020

(30) Foreign Application Priority Data

Dec. 21, 2018 (DE) ...................... 10 2018 133 388.9

(51) Int. Cl.
| | |
|---|---|
| *F16H 57/08* | (2006.01) |
| *F16H 1/36* | (2006.01) |
| *F16H 57/021* | (2012.01) |
| *F16H 57/023* | (2012.01) |

(Continued)

(52) U.S. Cl.
CPC ................. *F16H 1/36* (2013.01); *F02C 7/36* (2013.01); *F16H 57/021* (2013.01); *F16H 57/023* (2013.01); *F16H 57/082* (2013.01); *F05D 2220/32* (2013.01); *F05D 2240/61* (2013.01); *F16H 2057/02039* (2013.01)

(58) Field of Classification Search
CPC ........ F16H 1/36; F16H 57/021; F16H 57/023; F16H 57/082; F16H 2057/02039; F16H 1/2836; F02C 7/36; F05D 2220/32; F05D 2240/61
See application file for complete search history.

(56) References Cited

U.S. PATENT DOCUMENTS

| | | | | |
|---|---|---|---|---|
| 3,178,967 A | * | 4/1965 | Fritsch | ................. F16H 1/2836 |
| | | | | 475/346 |
| 4,986,802 A | * | 1/1991 | Scoville | ............... F16H 1/2836 |
| | | | | 475/334 |

(Continued)

FOREIGN PATENT DOCUMENTS

| | | | | |
|---|---|---|---|---|
| CN | 102996781 A | * | 3/2013 | ........... F16H 57/082 |
| CN | 106536995 A | * | 3/2017 | ........... F16H 57/082 |

(Continued)

OTHER PUBLICATIONS

German Search Report dated Sep. 25, 2019 from counterpart German Patent Application No. 102018133388.9.

*Primary Examiner* — Sherry L Estremsky
(74) *Attorney, Agent, or Firm* — Shuttleworth & Ingersoll, PLC; Timothy Klima

(57) ABSTRACT

A planetary gear box, which has a sun gear, a plurality of planet gears, a ring gear, a plurality of planet pins an axially front carrier plate and an axially rear carrier plate, wherein the planet pins are connected to the carrier plates. Provision is made whereby the planet pins, at their axial ends, have in each case one platform, radially oriented slots are formed on the carrier plates, and the platforms are pushed via guide grooves into the radially oriented slots. The invention furthermore relates to a method for the assembly of a planetary gear box.

18 Claims, 11 Drawing Sheets

(51) Int. Cl.
    *F02C 7/36*    (2006.01)
    *F16H 57/02*   (2012.01)

(56)           References Cited

U.S. PATENT DOCUMENTS 5,145,471  A  *  9/1992   Meier-Burkamp ... F16H 57/082
                                                        475/331
    5,269,733  A  * 12/1993   Anthony, III ......... B25B 21/026
                                                        173/171
    5,558,593  A  *  9/1996   Roder ....................... F16H 1/28
                                                        475/331
    8,205,432  B2 *  6/2012   Sheridan ................... F02C 7/36
                                                        60/226.3
 2003/0181284  A1 *  9/2003   Chen ..................... F16H 57/082
                                                        475/331
 2008/0276756  A1 * 11/2008   Marumoto ........... G03G 15/757
                                                        399/167
 2015/0354694  A1 * 12/2015   Degenhart .............. B23P 15/14
                                                        475/331

FOREIGN PATENT DOCUMENTS

CN        207093679  U  *  3/2018
    DE      102009028517 A1 *  2/2011   .......... F16H 57/082
    DE      102014105924 A1 * 10/2015   .......... F16H 57/082
    DE      102014105924 A1   10/2015
    DE      102016213452 A1   12/2017
    EP         3392527   A1   10/2018
    GB         1073535   A  *  6/1967   .......... F16H 1/2836
    WO    WO-2019101792 A1 *  5/2019   ............. F16D 65/14

* cited by examiner

PLANETARY GEARBOX AND METHOD FOR ASSEMBLING A PLANETARY GEARBOX

This application claims priority to German Patent Application DE102018133388.9 filed Dec. 21, 2018, the entirety of which is incorporated by reference herein.

The invention relates to a planetary gear box according to the present disclosure, and to a method for the assembly of a planetary gear box of said type.

It is known for the fan of a gas turbine engine to be coupled to a turbine shaft via a gear box. A gear box of this kind may be designed as a planetary gear box, wherein the planetary gear box receives an input from the turbine shaft and outputs drive for the fan so as to drive the fan at a lower rotational speed than the turbine shaft. The planetary gear box comprises planet gears, which are driven by a sun gear and which revolve in a ring gear. Arranged in each of the planet gears is a planet pin, which is fixed in carrier plates of a planet carrier. The planet carrier is coupled to a drive for the fan.

For the fastening of a planet pin into the carrier plates of the planet carrier, it is known for the planet pin to be arranged in openings of the carrier plate so as to realize a strong interference fit. This involves a high level of outlay in terms of production. Furthermore, the stiffness of the carrier plates is reduced by the openings formed on the carrier plates for receiving the planet pins.

The present invention is based on the object of providing a planetary gear box in the case of which the connection between the planet pins and the carrier plates does not impair, or impairs only to a small extent, the stiffness of the carrier plates. It is furthermore sought to provide a method for the assembly of a planetary gear box of said type.

Said object is achieved by means of a planetary gear box a method, and a gas turbine engine having features as disclosed herein. Refinements of the invention are indicated in the present disclosure.

Accordingly, the present invention concerns a planetary gear box which comprises a sun gear, a multiplicity of planet gears and a ring gear. The sun gear rotates about an axis of rotation of the planetary gear box and is driven by a sun shaft. The plurality of planet gears is driven by the sun gear and engages with the ring gear. The planetary gear box furthermore comprises a plurality of planet pins which each have a front axial end and a rear axial end, wherein in each case one planet pin is arranged in one planet gear. An axially front carrier plate and an axially rear carrier plate are provided, wherein the planet pins are connected to the carrier plates.

According to a first aspect of the invention, it is provided that the planet pins, at their axial ends, have in each case one platform which constitutes a rotationally fixed constituent part of the respective planet pin, that radially oriented slots are formed on the carrier plates, and that the platforms are pushed via guide grooves into the radially oriented slots. In this way, a connection of the planet pins to the carrier plates is provided.

The present invention provides a new fastening concept for the connection of the planet pins to the carrier plates of the planet carrier, which does not require the use of openings in the carrier plates for the fastening of the planet pins. Instead, slots are formed in or on the carrier plates, into which slots platforms arranged at the ends of the planet pins are pushed.

For the guidance of the platforms in the slots, the carrier plates have guide grooves in which the platforms are guided. Alternatively, the platforms themselves may form guide grooves, into which edge structures of the slots engage.

The statement that the slots are formed radially on the carrier plates means that the extent direction of said slots has a radial component. It is not necessary here for the slots to extend exactly in the radial direction. It is furthermore possible for the slots to be selectively of rectilinear or arcuate form.

The solution according to the invention provides increased stiffness of the carrier plates and thereby leads to an improved transmission of force to the carrier plates and thus, overall, to improved performance and reduced wear of the planetary gear box. Cumbersome measures for the arrangement of the planet pins in openings, with the formation of an interference fit, are eliminated.

One embodiment of the invention provides that the radially oriented slots on the carrier plates extend in an axial direction in each case over only a partial thickness of the carrier plates, that is to say they do not form any openings in the carrier plates. Rather, in the regions that form the slots, the carrier plates form continuous structures substantially without openings, which are merely of thinner form in the region of the slots. In this way, a further increased stiffness of the carrier plates is provided, which leads to a further improved transmission of force to the carrier plates.

It is however pointed out that, in refinements of the invention, provision may alternatively be made whereby the radially oriented slots extend over the entire axial extent of the carrier plate, and thus form openings in the carrier plates. In such a refinement, the required stiffness in the connection between the platform of the respective planet pin and the carrier plate is realized by means of the groove connection or the guide grooves. For this purpose, provision may for example be made whereby a correspondingly deep guide groove is used.

One refinement of the invention provides that the two platforms have a different diameter, wherein at least one of the platforms has a diameter smaller than the diameter of the main body of the planet pin. Here, the main body of the planet pin is that part of the planet pin which extends between the two platforms. The main body is at least approximately cylindrical or hollow cylindrical. A diameter of the platform refers to the largest diameter of the platform.

By virtue of the fact that at least one of the platforms has a diameter smaller than the diameter of the main body, it is achieved that the planet gear can be pushed onto the planet pin before the installation of the planet pin on the planet carrier. If this condition is not met, the planet gear must be pushed onto the planet pin before the second platform is attached to the planet pin.

A further refinement of the invention provides that one platform has a diameter smaller than the diameter of the main body of the planet pin, and the other platform has a diameter larger than the diameter of the main body of the planet pin. Here, it is the case that a large diameter of the platform is basically advantageous, because a transmission of torque from the planet pins to the carrier plate takes place via longitudinal edges of the platform, which are arranged in guide grooves of the carrier plate. Accordingly, it is also advantageous if the platform whose diameter is larger than the diameter of the main body of the planet pin is arranged in the axially front carrier plate, that is to say that carrier plate which transmits the torque of the planetary gear box at the output side, for example to a shaft coupled to the fan of a gas turbine engine.

In order to achieve a transmission of torque from the planet pin to the carrier plate also in the case of the platform whose diameter is smaller than the diameter of the main body of the planet pin, provision is made, in one refinement of the invention, that a constriction is formed between said platform and the main body of the planet pin, which constriction corresponds for example to the width of the slot. Here, those regions of the platform which project radially in relation to the constriction form regions, in particular longitudinal edges, which are arranged in guide grooves of the carrier plate and via which a transmission of torque to the carrier plate occurs.

The platforms may each be formed as a planar plate which has a constant thickness (aside from the regions that form the slots, and possible cutouts). Furthermore, it may be provided that the platforms have the shape of a polygon, in particular are formed for example as a rectangle, as a square or as an octagon.

A further embodiment provides that the carrier plates each have a central cutout which defines a radially inner edge of the carrier plate, wherein the slots extend radially outward proceeding from the radially inner edge on the carrier plate. The platforms are inserted into the radially inner opening of the slots via the central cutout. After installation of the platforms and planet pins on the planet carriers, the central cutout serves for the insertion of the sun gear of the planetary gear box axially into the planetary gear box and for the arrangement of said sun gear centrally in said planetary gear box.

Alternatively, it may be provided that the slots extend radially inward proceeding from the radially outer edge of the carrier plate.

A further refinement of the invention provides that the radially oriented slots of the carrier plates have a radially inner entrance opening and a radially outer end, wherein the platforms are arranged spaced apart from the radially outer end in the slot, such that, in each case, the portion of the slot between the platform and the radially outer end forms a radial elongation. Here, it may be provided that said radial elongation is filled by a filler element.

The formation of the slot with such a radial elongation makes it possible, before the coupling of the planet gears to the sun gear, for the planet pins and thus also the planet gears to be displaced radially outward from their assembled position into the radially oriented slots of the carrier plates, such that the sun gear can be pushed axially into the planet carrier via a central cutout in one of the carrier plates without the toothing of the planet gears impeding such placement of the sun gear. Subsequently, the planet pins are displaced radially inward, with engagement being provided between the teeth of planet gear and sun gear. The radial elongation which is then freed up, and which is no longer required, is in each case filled with a filling element after the coupling of the planet gears to the sun gear. Such a refinement is expedient in particular if the teeth of the planet gear and sun gear are in the form of a double helical toothing.

A further refinement of the invention provides that, into the slots formed in the carrier plates, there are inserted securing plates which secure the platforms against displacement. Accordingly, after insertion of the platforms into the slots, securing plates are then inserted into and fastened in the slots. For this purpose, it is for example provided that the securing plates are connected to the carrier plates by means of fastening elements such as for example screw connections or bolt connections.

Furthermore, it may be provided that the platforms themselves are also additionally connected to the carrier plates by means of fastening elements such as for example screw connections or bolt connections, whereby the rotationally conjoint connection between planet pin and carrier plate is additionally secured.

As already mentioned, the platforms are guided in guide grooves. These are formed for example at the lateral boundaries of the radially oriented slots in the carrier plates. The guide grooves may however basically also be formed on the platforms themselves.

In one refinement of the invention, the main body and the platforms of the planet pin are formed as a single piece and produced jointly. Alternatively, the platforms are fastened, for example welded, to the previously produced main body of the planet pin.

According to a second aspect of the invention, the present invention relates to a method for the assembly of a planetary gear box as disclosed herein. The method comprises the steps:
  providing a planet carrier which comprises the axially front carrier plate and the axially rear carrier plate,
  pushing in each case one planet gear onto one planet pin,
  subsequently connecting the planet pins to the carrier plates by virtue of the planet pins being pushed with their platforms, which constitute a rotationally fixed constituent part of the respective planet pin, into the radially oriented slots of the carrier plates,
  coupling the planet gears to the sun gear, and
  coupling the planet gears to the ring gear.

Accordingly, the method is distinguished by the fact that the planet gears are pushed onto the planet pins before installation in the planet carrier takes place.

One refinement of the method provides that, before the coupling of the planet gears to the sun gear, the planet pins (with the planet gears installed thereon) are displaced radially outward from the assembled position (that is to say the position in which the planet pin is arranged in the fully assembled planetary gear box) into the radially oriented slots of the carrier plates. The space that is thereby gained radially at the inside makes it possible for the sun gear to subsequently be pushed axially into the planet carrier via a central cutout in one of the carrier plates. The planet pins are subsequently displaced radially inward again into the assembled position, with engagement being provided between the respective teeth of planet gear and sun gear. In order to permit such a radial displacement of the planet pins, the slots have a radial elongation. In one refinement, these are each filled with a filler element after the coupling to the sun gear. This method variant is expedient in particular if the teeth of the planet gear and of the sun gear are in the form of a double helical toothing.

One refinement of the method provides that the slots are closed, after the platforms of the planet pins have been pushed in, by means of securing plates which are pushed into the slots after the platforms.

A further refinement of the method provides that the platforms are additionally connected to the carrier plates by means of fastening elements.

A further aspect of the present invention relates to a gas turbine engine for an aircraft, which has a planetary gear box according to the invention. Here, the gas turbine engine comprises an engine core which comprises a turbine, a compressor and a turbine shaft connecting the turbine to the compressor and formed as a hollow shaft. The gas turbine engine furthermore comprises a fan, which is positioned upstream of the engine core, and a planetary gear box according to the invention, which receives an input from the turbine shaft and which outputs drive for the fan so as to drive the fan at a lower rotational speed than the turbine shaft.

According to one refinement of the invention,
the turbine is a first turbine, the compressor is a first compressor, and the turbine shaft is a first turbine shaft;
the engine core further comprises a second turbine, a second compressor, and a second turbine shaft which connects the second turbine to the second compressor; and
the second turbine, the second compressor, and the second turbine shaft are arranged so as to rotate at a higher rotational speed than the first turbine shaft.

It is pointed out that the present invention, to the extent that the latter relates to an aircraft engine, is described with reference to a cylindrical coordinate system which has the coordinates x, r, and φ. Herein x indicates the axial direction, r indicates the radial direction, and φ indicates the angle in the circumferential direction. The axial direction herein is defined by the rotation axis of the planetary gear box, said rotation axis being identical to a machine axis of a geared fan engine in which the planetary gear box is arranged. Proceeding from the x-axis, the radial direction points radially outward. Terms such as "in front of", "behind", "front", and "rear" refer to the axial direction, or the flow direction in the engine in which the planetary gear box is arranged, respectively. Terms such as "outer" or "inner" refer to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure may be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor, and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by the core shaft (for example the first core shaft in the example above) that is configured to rotate (for example during use) at the lowest rotational speed. For example, the gear box may be arranged so as to be driven only by the core shaft (for example only by the first core shaft, and not the second core shaft, in the example above) that is configured to rotate (for example during use) at the lowest rotational speed. Alternatively thereto, the gear box may be arranged so as to be driven by one or more shafts, for example the first and/or the second shaft in the example above.

In the case of a gas turbine engine as described and/or claimed herein, a combustion chamber may be provided axially downstream of the fan and of the compressor(s). For example, the combustion chamber may lie directly downstream of the second compressor (for example at the exit of the latter), if a second compressor is provided. By way of further example, the flow at the exit of the compressor may be provided to the inlet of the second turbine, if a second turbine is provided. The combustion chamber may be provided so as to be upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from each other.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which may simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan at cruise conditions may be less than 2500 rpm, for example less than 2300 rpm. Purely by way of further non-limiting example, the rotational speed of the fan at cruise conditions for an engine having a fan diameter in the range from 250 cm to 300 cm (for example 250 cm to 280 cm) can also be in the range from 1700 rpm to 2500 rpm, for example in the range from 1800 rpm to 2300 rpm, for example in the range from 1900 rpm to 2100 rpm. Purely by way of further non-limiting example, the rotational speed of the fan at cruise conditions for an engine having a fan diameter in the range from 320 cm to 380 cm can be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) speed of the fan tip, for example at the leading periphery of the tip (which can be defined as the fan tip radius at the leading periphery multiplied by the angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core under cruise conditions. In the case of some arrangements, the bypass ratio may be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of non-limiting example, the overall pressure ratio of a gas turbine engine as described and/or claimed herein at constant speed can be greater than (or in the magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely as a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET during the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil may be manufactured at least in part from a composite, for example a metal matrix composite and/or an organic matrix composite, such as carbon fiber. By way of a further example, at least a part of the fan blade and/or of the airfoil may be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least a part of the fan blades may be attached to the hub/disk by welding, such as linear friction welding.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely as an example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine described and/or claimed herein may be operated at the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide the thrust force.

It is self-evident to a person skilled in the art that a feature or parameter described in relation to any one of the above aspects may be applied to any other aspect, unless they are mutually exclusive. Furthermore, any feature or any parameter described here may be applied to any aspect and/or combined with any other feature or parameter described here, unless they are mutually exclusive.

The invention will be explained in more detail below on the basis of a plurality of exemplary embodiments with reference to the figures of the drawing. In the drawing.

Figure 1:
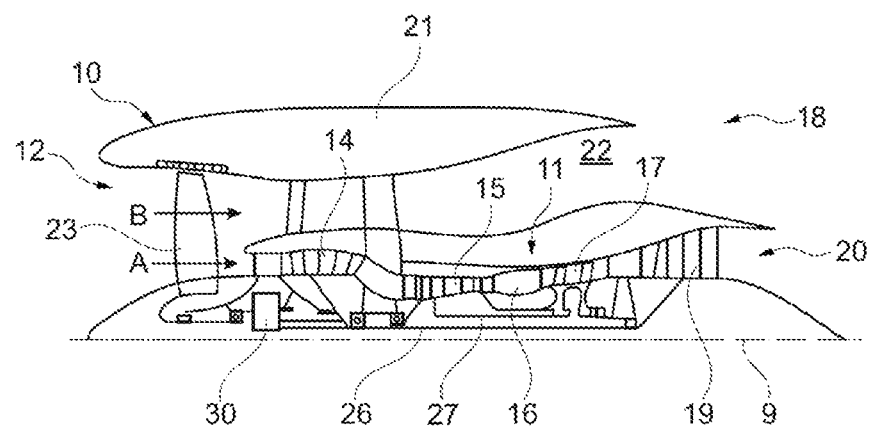
FIG. 1 shows a lateral sectional view of a gas turbine engine.

FIG. 1 illustrates a gas turbine engine 10 having a main axis of rotation 9. The engine 10 comprises an air intake 12 and a thrust fan or fan 23 that generates two air flows: a core air flow A and a bypass air flow B. The gas turbine engine 10 comprises a core 11 which receives the core air flow A.

In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
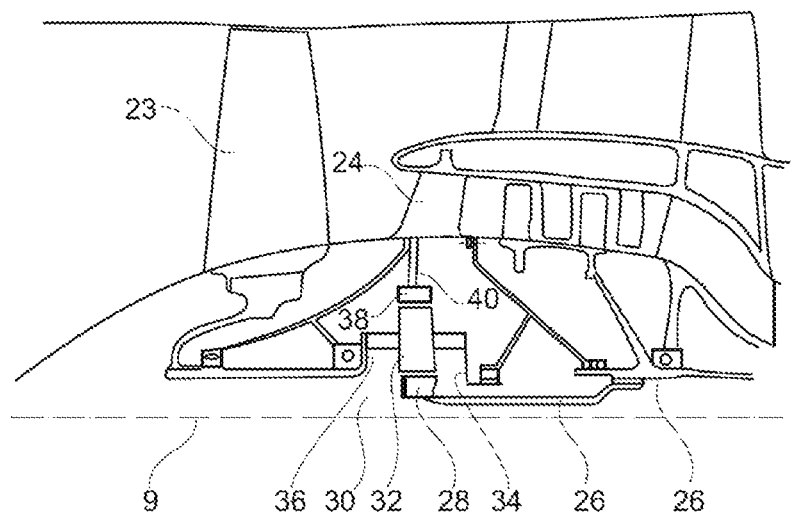
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box arrangement 30. Radially to the outside of the sun gear 28 and meshing therewith are a plurality of planet gears 32 that are coupled to one another by a planet carrier 34. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary supporting structure 24.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some literature, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
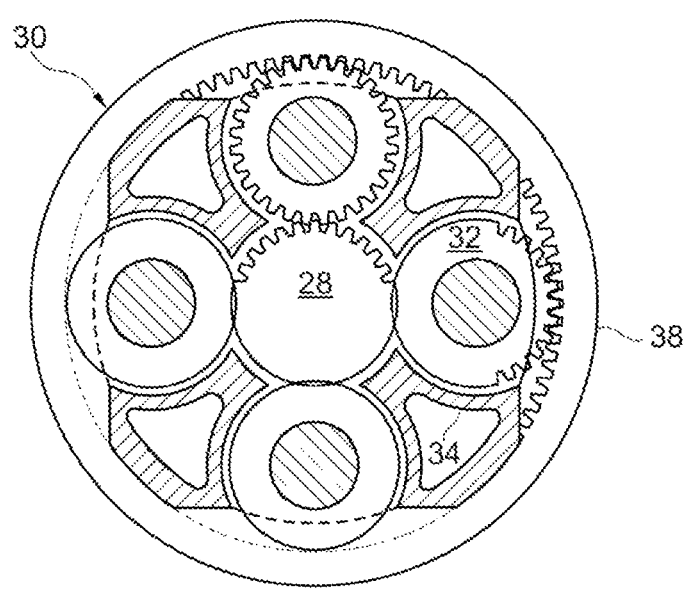
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to a person skilled in the art that more or fewer planet gears 32 can be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in that the planet carrier 34 is coupled to an output shaft via linkages 36, wherein the ring gear 38 is fixed. However, any other suitable type of epicyclic gear box 30 may be used. By way of a further example, the epicyclic gear box 30 may be a star arrangement, in which the planet carrier 34 is held so as to be fixed, wherein the ring gear (or annulus) 38 is allowed to rotate. In the case of such an arrangement, the fan 23 is driven by the ring gear 38. By way of a further alternative example, the gear box 30 may be a differential gear box in which the ring gear 38 and the planet carrier 34 are both allowed to rotate.

It is self-evident that the arrangement shown in FIGS. 2 and 3 is merely an example, and various alternatives fall within the scope of protection of the present disclosure. Purely by way of example, any suitable arrangement may be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box casing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box can drive additional and/or alternative components (e.g. the intermediate pressure compressor and/or a booster compressor).

Other gas turbine engines to which the present disclosure can be applied can have alternative configurations. For example, engines of this type may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. While the example described relates to a turbofan engine, the disclosure may be applied, for example, to any type of gas turbine engine, such as an open-rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

Figure 4:
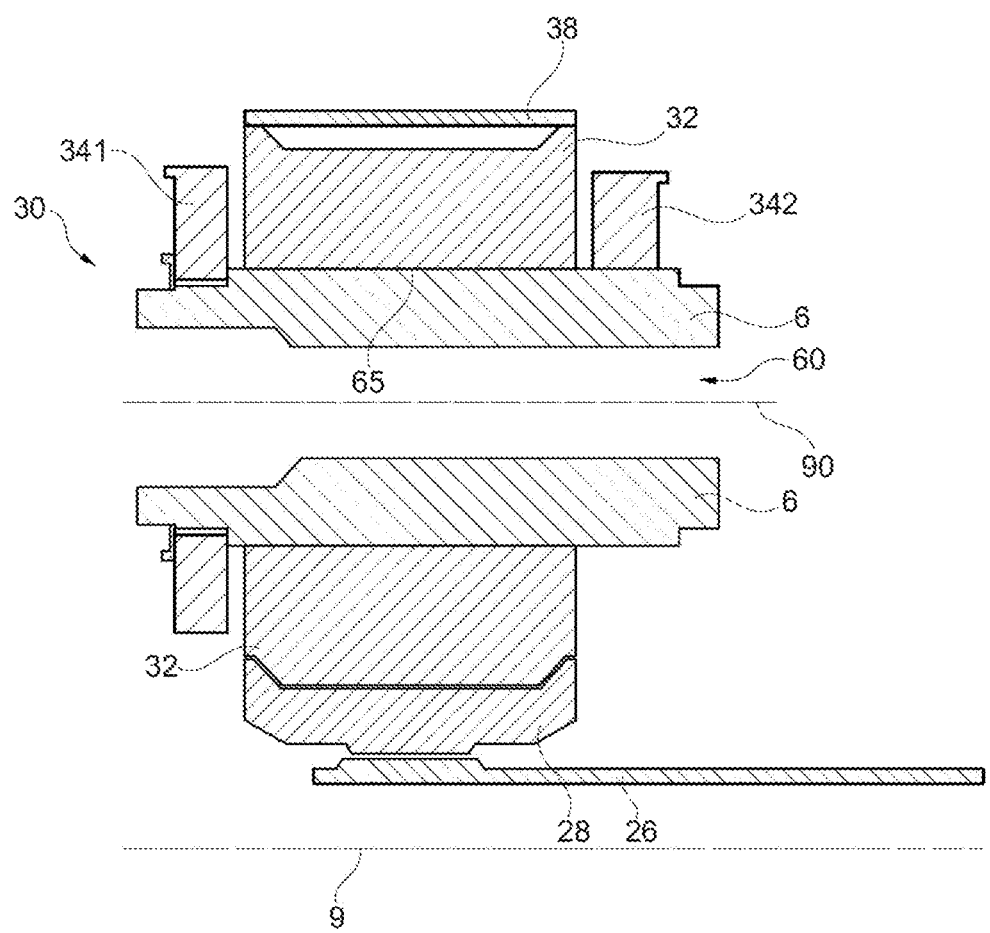
FIG. 4 shows a sectional illustration of elements of a planetary gear box which is suitable for use in a gas turbine engine as per FIG. 1.

FIG. 4 shows schematically and by way of example an embodiment of a planetary gear box of a gas turbine engine 10 designed as a geared fan engine as shown in FIG. 1 in a sectional illustration. The planetary gear box 30 comprises a sun gear 28, which is driven by a drive shaft or sun shaft 26. The drive shaft 26 is the shaft 26 in FIGS. 1 and 2 or, more generally, a turbine shaft. In this arrangement, the sun gear 28 and the drive shaft 26 rotate around the axis of rotation 9. The axis of rotation of the planetary gear box 30 is identical to the axis of rotation 9 or engine axis of the gas turbine engine 10.

The planetary gear box 30 furthermore comprises a plurality of planet gears 32, one of which is illustrated in the sectional illustration in FIG. 4. The sun gear 28 drives the plurality of planet gears 32, wherein a toothing of the sun gear 28 is in engagement with a toothing of the planet gear 32.

The planet gear 32 is of hollow cylindrical design and forms an outer lateral surface and an inner lateral surface. Driven by the sun gear 28, the planet gear 32 rotates around an axis of rotation 90, which is parallel to the axis of rotation 9. The outer lateral surface of the planet gear 32 forms a toothing, which is in engagement with the toothing of a ring gear 38. The ring gear 38 is arranged in a fixed manner, i.e. in such a way that it does not rotate. Owing to their coupling with the sun gear 28, the planet gears 32 rotate and, at the same time, move along the circumference of the ring gear 38. The rotation of the planet gears 32 along the circumference of the ring gear 38 and simultaneously around the axis of rotation 90 is slower than the rotation of the drive shaft 26, thereby providing a reduction ratio.

Adjoining its inner lateral surface, the planet gear 32 has a centered axial opening. A planet pin 6 is inserted into the opening, said pin itself having an axial bore 60 whose longitudinal axis is identical to the axis of rotation 90 of the planet gear 32, wherein the planet pin 6 and the planet gear 32 form, at the mutually facing surfaces thereof, a bearing 65, e.g. a rolling bearing or a plain bearing.

FIG. 4 furthermore shows a front carrier plate 341 and a rear carrier plate 342, which are constituent parts of the planet carrier 34, cf. FIG. 2. The planet pin 6 is fixedly connected to the front carrier plate 341 and to the rear carrier plate 342. The front carrier plate 341 is for example connected to a torque transmitting member, which is coupled to a fan shaft.

In the context of the present invention, the connection of the planet pin 6 to the carrier plates 341, 342 is of importance.

FIGS. 5 to 18 show an exemplary embodiment of a planetary gear box, or illustrations of parts or regions of a planetary gear box of said type. Here, for a clear illustration of the connection of the planet pins to the carrier plates, neither the sun gear nor the planet gears nor the ring gear of the planetary gear box are illustrated. In this respect, reference is made to the illustration of FIGS. 2 to 4.

Figure 5:
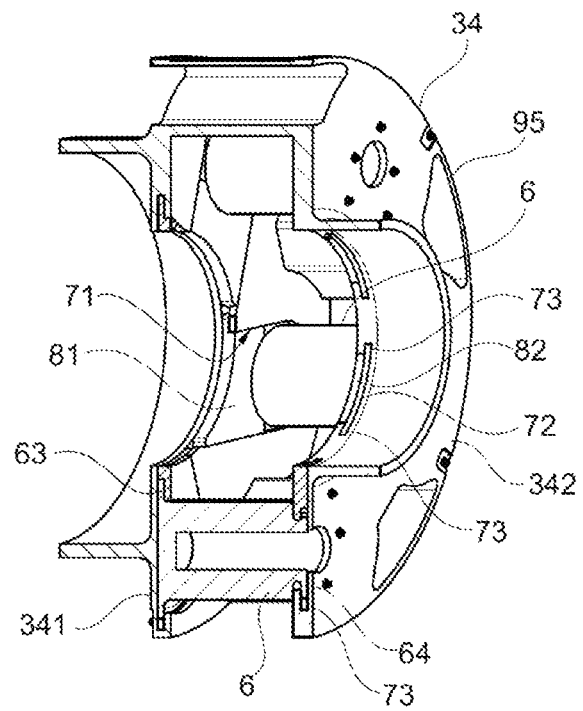
FIG. 5 shows a partially sectional perspective illustration of an exemplary embodiment of a planetary gear box, in the carrier plates of which there are formed slots for receiving platforms which are formed at the ends of planet pins.

As per the partially sectional view of FIG. 5, the planetary gear box comprises a planet carrier 34, which has, in a spaced-apart and parallel arrangement, an axially front carrier plate 341 and an axially rear carrier plate 342. The two carrier plates 341, 342 are fixedly connected to one another by means of supporting lugs 95, which can also be seen in FIGS. 17 and 18. Radially extending slots 71, 72 are formed in each of the two carrier plates 341, 342. As will be discussed below, the slots 71, 72 serve for receiving platforms formed on the planet pins.

Figure 6:
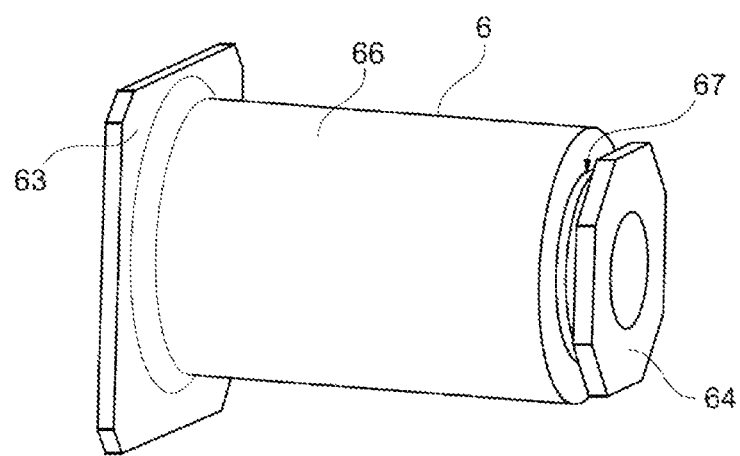
FIG. 6 shows an exemplary embodiment of a planet pin of a planetary gear box as per FIG. 5, which forms two platforms of different size at its ends.

The design of the planet pins 6 is illustrated by way of example in FIG. 6. Said figure shows an exemplary embodiment of a planet pin 6 with two platforms 63, 64 formed at the end sides of the planet pin 6. Here, the planet pin 6 comprises a main body 66, which is a hollow cylindrical or substantially hollow cylindrical form. At one end of the cylindrical main body 66, there is arranged an axially front platform 63, which has a larger diameter than the main body 66 of the planet pin 6. At the other end of the cylindrical main body 66, there is arranged an axially rear platform 64, which has a smaller diameter than the main body 66 of the planet pin 6.

By virtue of the axially rear platform 64 being formed with a diameter smaller than the diameter of the main body 66, it is possible for a planet gear (not illustrated) to be pushed onto the main body 66 from the axially rear end. It is thus possible for the planet gear to firstly be pushed onto the planet pin, and for the planet pin with the planet gear already installed to subsequently be fastened in the planet carrier 34.

The platforms 63, 64 are for example welded to the main body 66. Alternatively, they are manufactured integrally with the main body 66.

The planet pin 6, at the end that forms a platform 64 with a diameter smaller than the diameter of the main body 66, has a constriction 67 between the main body 66 and the platform 64. Here, in the region of the constriction 67, the planet pin 6 has a reduced diameter, which is equal to the width of the slot 72 into which the platform 64 has been pushed. Those regions of the platform 64 which project radially relative to the constriction 67 are in this case guided in two opposite portions in a guide groove of the carrier plate 342. The exact nature of the fastening of the platform 64 in the carrier plate 342 will be described on the basis of the further figures, in particular FIGS. 10 and 12.

Figure 7:
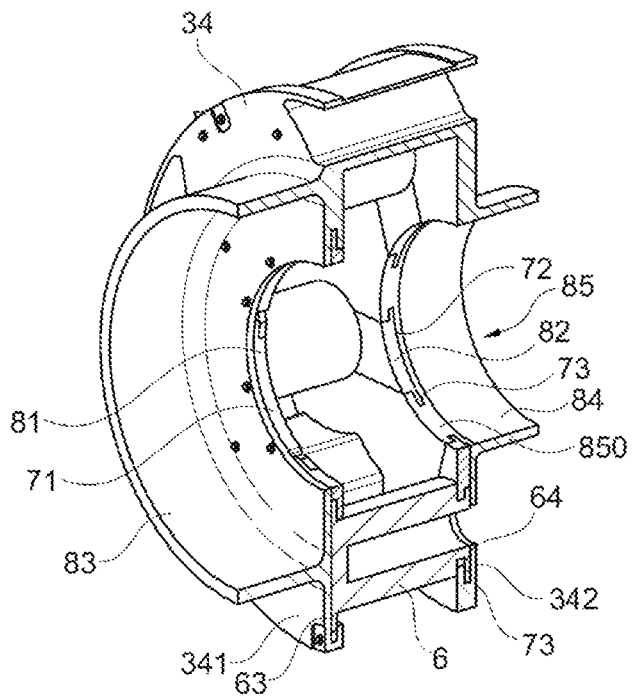
FIG. 7 shows the planetary gear box of FIG. 5 in another partially sectional perspective illustration.

FIG. 7 is a further perspective, partially sectional view of the planetary gear box or of the planet carrier 30. It can be seen here that the axially front carrier plate 341 is connected to a cylindrical torque transmitting member 83, via which an output-side torque can be transmitted for example to an output shaft. The axially rear carrier plate 342 has a cylindrical connector 74. The cylindrical torque transmitting member 83 and the cylindrical connector 74 are illustrated merely by way of example and are not mandatory constituent parts of the planet carrier. Both the axially front carrier plate 341 and the axially rear carrier plate 342 have a central cutout 85 which forms a radially inner edge 850 of the respective carrier plate 341, 342.

The abovementioned slots 71, 72 extend radially outward proceeding from the radially inner edge 850. As illustrated in FIGS. 5 and 7, securing plates 81, 82 are arranged in the slots 71, 72. Said securing plates 81, 82 are however inserted into the slots 71, 72 only after the platforms 63, 64 have been pushed into the slots 71, 72. Said securing plates serve for securing the platforms 63, 64 in their assembled position and additionally structurally reinforcing the carrier plates 341, 342 in the region of the slots 71, 72.

Alternatively, it may be provided that the slots 71, 72 extend radially inward proceeding from the radially outer edge of the carrier plates 341, 342. These securing plates 81, 82 are in this case likewise pushed into the slots from the radially outer edge.

In FIGS. 5 and 7, it can also be seen that the platforms 63, 64 of the planet pins 6 (and likewise the securing plates 81, 82) are guided in guide grooves 73, wherein the guide grooves 73, in the case of the axially front platform 63, receive oppositely situated regions of the platform 63 which project in relation to the main body 66. In the case of the axially rear platform 64, the guide grooves 73 receive oppositely situated regions of the platform 64 which project radially in relation to the constriction 67 (compare FIG. 6). Here, the guide grooves 73 are formed at the lateral boundaries of the slots 71, 72 in the respective carrier plate 341, 342.

Figure 8:
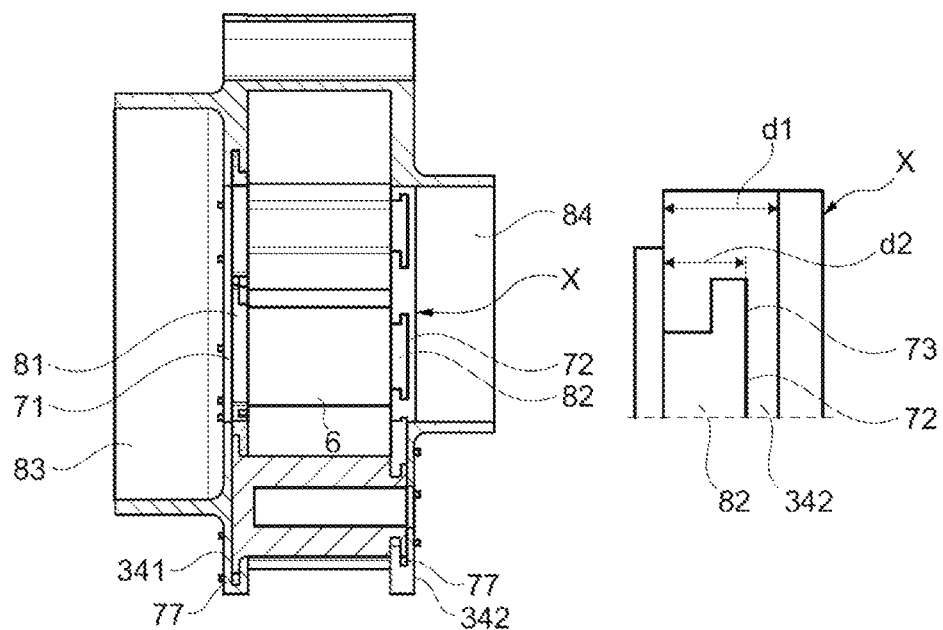
FIG. 8 shows the planetary gear box of FIG. 5 in an axial sectional view.

FIG. 8 shows a sectional illustration of the planetary gear box. Here, the detail X, which is illustrated on an enlarged scale, shows the nature of the form of the slots 71, 72 in the respective carrier plate 341, 342. As per the detail X, the carrier plate 342 has a thickness d1 in the axial direction. By contrast, the slot 72 extends in the axial direction only over a partial thickness d2 which is smaller than the total thickness d1. The same applies to the carrier plate 341 and the slots 71 formed there. The slots 71, 72 thus do not constitute cutouts within the respective carrier plate 341, 342 which extend all the way through the latter, but rather form a structure on the carrier plate which is of continuous form and which merely forms a relatively thin wall or thickness in the region of the slots 71, 72. It is achieved in this way that the slots 71, 72 do not impair the structural strength of the carrier plates 341, 342, and these have a high stiffness.

The guide grooves 73 can also be seen in the detail X.

It is however pointed out that other refinements are basically also possible in which the slots extend over the entire axial thickness of the carrier plate, that is to say form of openings in the carrier plate. In this case, d2=d1. In such a refinement, it is provided that the guide groove has a relatively large depth, because the required stiffness of the connection between platform or planet pin and carrier plate is realized in this case by means of the groove connection.

Figure 9:
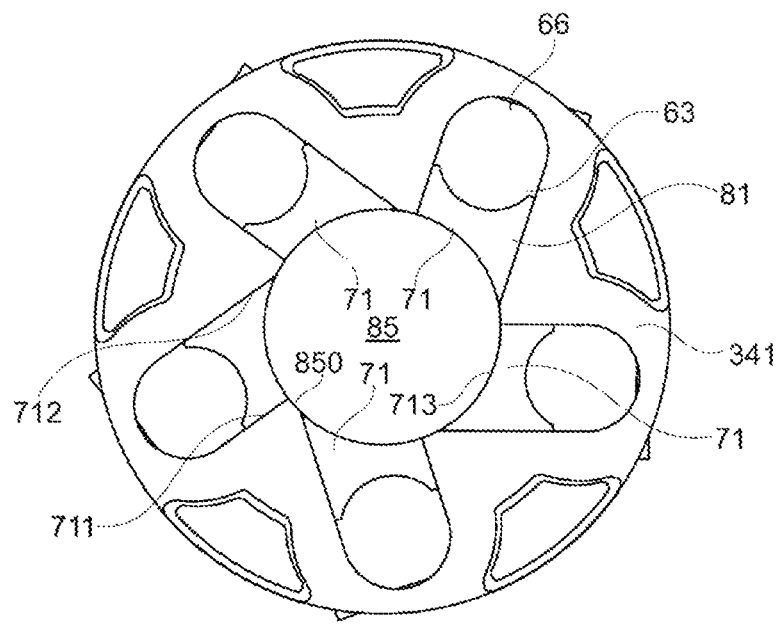
FIG. 9 shows a plan view from the inside of the axially front carrier plate of the planetary gear box of FIG. 5.

FIG. 9 shows a plan view from the inside of the axially front carrier plate 341 of the planetary gear box. It can be clearly seen here that the slots 71 each in an outward radial direction from the central cutout 85. Each slot 71 has two lateral boundaries 711, 712 running parallel. Each slot 71 has a radially inner entrance opening 713, which is situated at the radially inner edge 850 of the central cutout 85, and a radially outer end, which cannot be seen in the illustration of FIG. 9. The slots have, between the lateral boundaries 711, 712, a width which is equal to or slightly larger than the diameter of the main body 66 of the planet pins 6. Here, it is possible to see a small part of the platform 63 that the planet pin 6 forms at one face end thereof.

Figure 10:
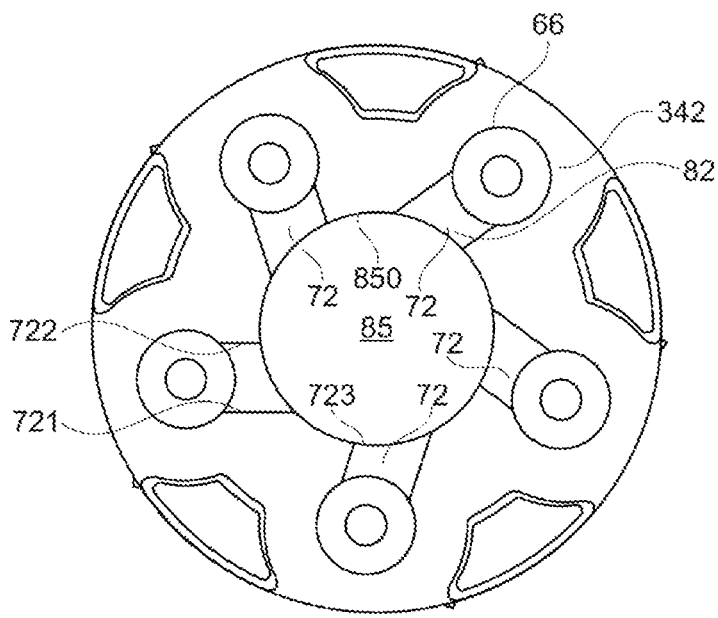
FIG. 10 shows a plan view from the inside of the axially rear carrier plate of the planetary gear box of FIG. 5.

FIG. 10 shows a plan view from the inside of the axially rear carrier plate 342 of the planetary gear box of FIG. 5. The slots 72 formed in the carrier plate 342 each likewise extend in an outward radial direction from the central cutout 85. Each slot 72 has two lateral boundaries 721, 722 running parallel. Each slot has a radially inner entrance opening 723, which is situated at the radially inner edge 850 of the central cutout 85, and a radially outer end, which cannot be seen in the illustration of FIG. 10. The slots have, between the lateral boundaries 721, 722, a width which is equal to or slightly larger than the diameter of the main body 66 of the planet pins 6. The radially rear platform 64, which has a smaller diameter than the main body, is in this case concealed by the main body 66.

It has been pointed out that the slots 71, 72 each have a radially outer end. It is provided here that the radially outer ends of the slots 71, 72 are arranged so as to be spaced apart in a radial direction from the platforms 63, 64 of the planet pins 6 when these are situated in the final assembled position. Accordingly, a radial elongation is situated between the platform 63, 64 and the radial end of the respective slot 71, 72. Said radial elongation 77 can be seen in FIG. 8, both in the case of the axially front platform 341 and in the case of the axially rear platform 342.

The purpose of such a radial elongation 77 consists in that, during the assembly of the planetary gear box, the planet pins 6 with the planet gears arranged thereon can be displaced radially outward, in order to provide additional space radially at the inside for the sun gear to be pushed in. Subsequently, the planet pins 6 with the planet gears are displaced radially inward again into the initial position, wherein the teeth of the planet gears and of the sun gears engage. The corresponding method will be discussed with regard to FIG. 19. A method of said type is expedient if double helical toothings are used.

Figure 11:
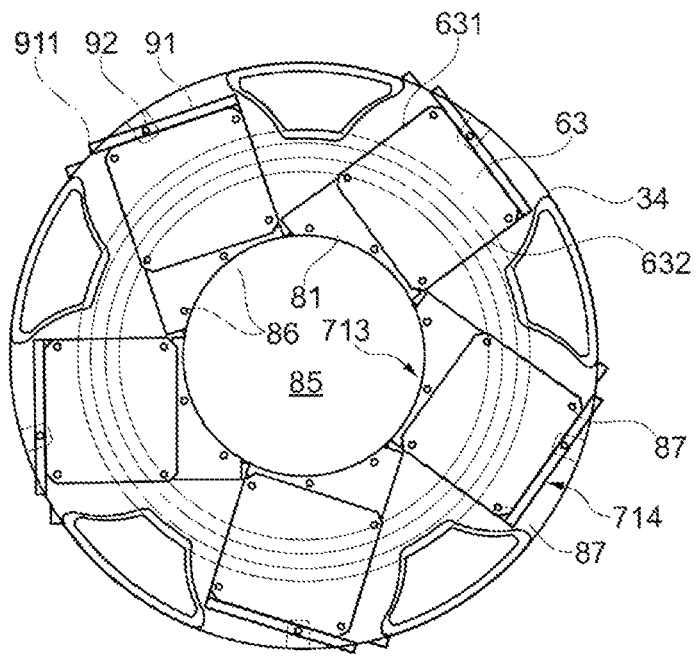
FIG. 11 shows a plan view from the outside of the axially front carrier plate of the planetary gear box of FIG. 5, wherein the front carrier plate is illustrated in transparent form.
Figure 12:
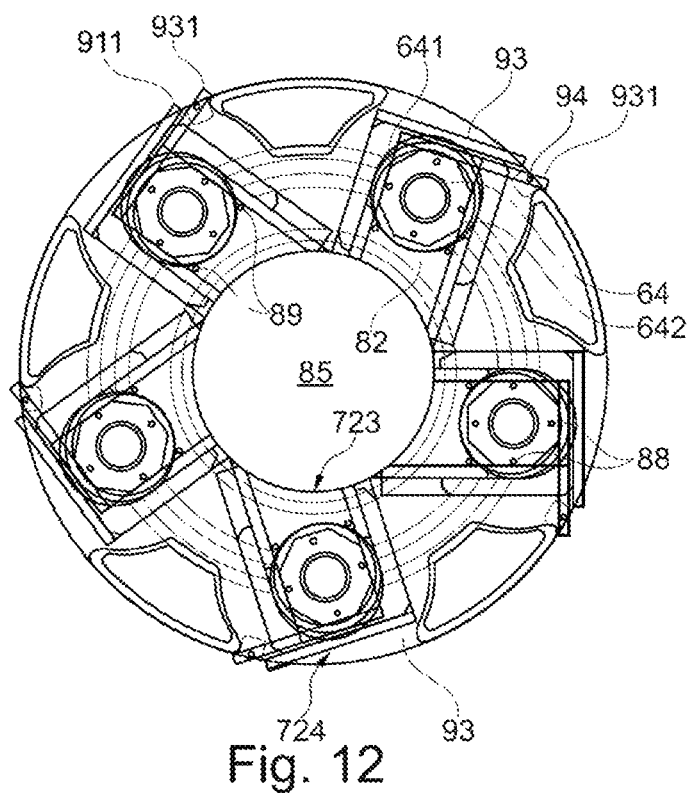
FIG. 12 shows a plan view from the outside of the axially rear carrier plate of the planetary gear box of FIG. 5, wherein the rear carrier plate is illustrated in transparent form.

FIGS. 11 and 12 show a plan view from the outside of the axially front carrier plate and the axially rear carrier plate, wherein the carrier plates are however illustrated in transparent form such that the platforms of the planet pins can be seen.

Accordingly, the axially front platforms 63 can be seen in FIG. 11. Said platforms have two oppositely situated longitudinal edges 631, 632, which are guided and arranged in the guide grooves 73 (which cannot be seen in FIG. 11). Here, a transmission of torque from the planet pins 6 to the axially front carrier plate 341 takes place via the longitudinal edges 631, 632.

The securing plates 81 that have been pushed into the slots 71 after the platforms 63 can also be seen in FIG. 11. Said securing plates are additionally connected, by means of fastening elements 86, to the axially front carrier plate 341. Furthermore, the platforms 63 themselves, after reaching the predetermined assembled position, are also fixedly connected, by means of fastening elements 87, to the axially front carrier plate 341.

It can also be seen in FIG. 11 that the radially oriented slots have a radially inner entrance opening 713 and a radially outer end 714. It is provided here that the radial elongation 77 of the radial slot 71, which elongation is illustrated in FIG. 8 and is required for the installation of the sun gear, is filled with a filler element 91 after the installation of the sun gear. The filler element 91 is for example a rod-shaped element which is pushed in via a lateral slot and which fills the radial elongation 77. Here, an end 911 of the filler element 5 projects relative to the outer surface of the planet carrier 34, such that the filler element 91 can be pushed in and removed again.

The axially rear platform 64, which is fastened to the axially rear carrier plate 342, can be seen in FIG. 12. The axially rear platform 64 has two oppositely situated longitudinal edges 641, 642, which are guided in the guide grooves 73 (which cannot be seen in FIG. 12). This guidance is possible owing to the constriction 67 illustrated in FIG. 6. Here, a transmission of torque from the planet pins 6 to the axially rear carrier plate 342 takes place via the longitudinal edges 641, 642.

The securing plates 82 that have been pushed into the slots 72 after the platforms 64 can also be seen in FIG. 12. Said securing plates are additionally connected, by means of fastening elements 89, to the axially rear carrier plate 342. Furthermore, the platforms 64, after reaching the predetermined assembled position, are also fixedly connected, by means of fastening elements 88, to the axially rear carrier plate 342.

It can also be seen in FIG. 12 that the radially oriented slots have a radially inner entrance opening 723 and a radially outer end 724. It is provided here that the radial elongation 77 of the radial slot 72, which elongation is illustrated in FIG. 8 and is required for the installation of the sun gear, is filled with a filler element 93 after the installation of the sun gear. The filler element 93 is for example a rod-shaped element which is pushed in via a lateral slot and which fills the radial elongation 77. Here, an end 931 of the filler element 5 projects relative to the outer surface of the planet carrier 34, such that the filler element 93 can be pushed in and removed again.

Figure 13:
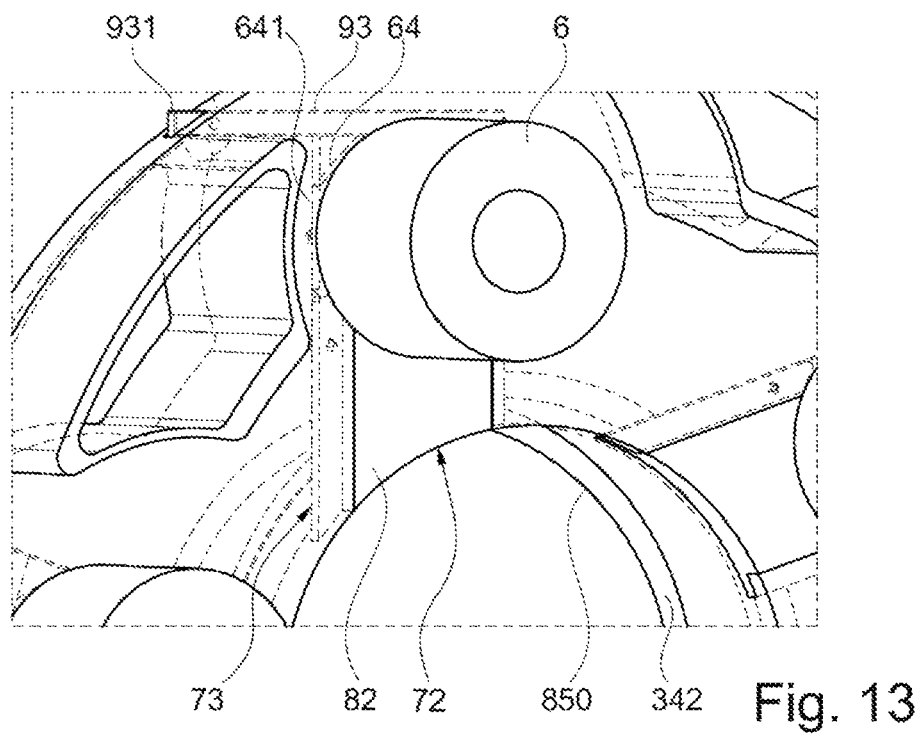
FIG. 13 shows a detail view of a portion of the axially rear carrier plate, with a planet pin inserted into a slot of the carrier plate.

FIG. 13 shows, in an enlarged detail illustration, the arrangement of a planet pin 6 at the axially rear carrier plate 342. It can be seen here that one longitudinal edge 641 of the platform 64 is arranged in the guide groove 73. The same applies to the opposite longitudinal edge. Into the radial elongation 77, which can be seen in FIG. 8, there is inserted a filler element 93, the end 931 of which protrudes. Furthermore, a securing plate 82 has been pushed into the slot 72.

Figure 14:
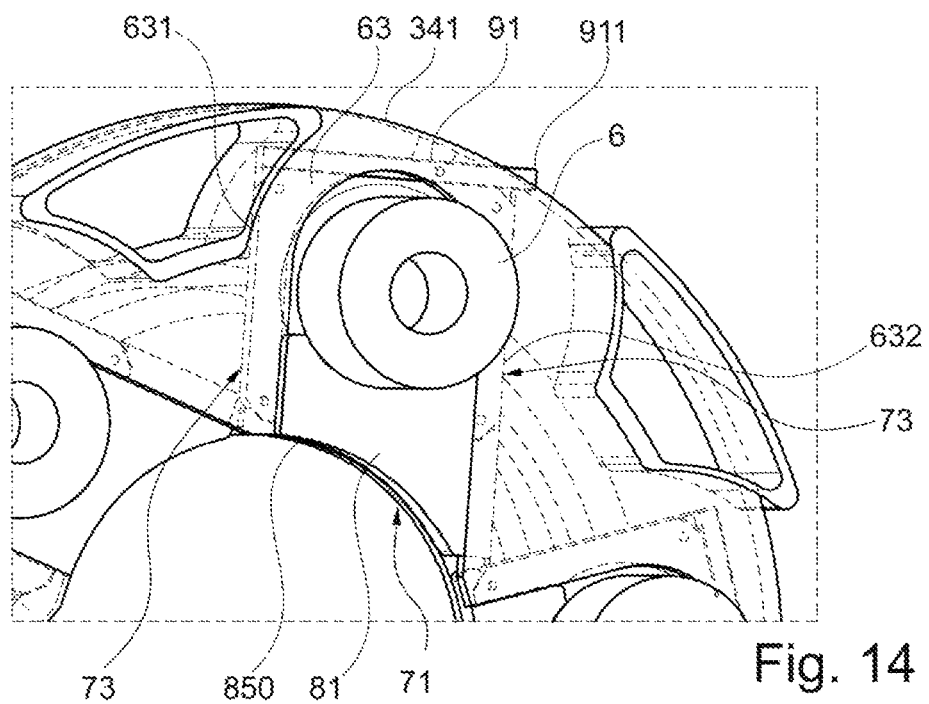
FIG. 14 shows a detail view of a portion of the axially front carrier plate, with a planet pin inserted into a slot of the carrier plate.

FIG. 14 shows, in an enlarged detail illustration, the arrangement of a planet pin 6 at the axially front carrier plate 341. The two longitudinal edges 631, 632 of the axially front platform 63 are in this case arranged in guide grooves 73 of the axially front carrier plate 341. Into the radial elongation 77, which can be seen in FIG. 8, there is inserted a filler element 91, the end 911 of which protrudes. Furthermore, a securing plate 81 has been pushed into the slot 71.

Figures 15, 16:
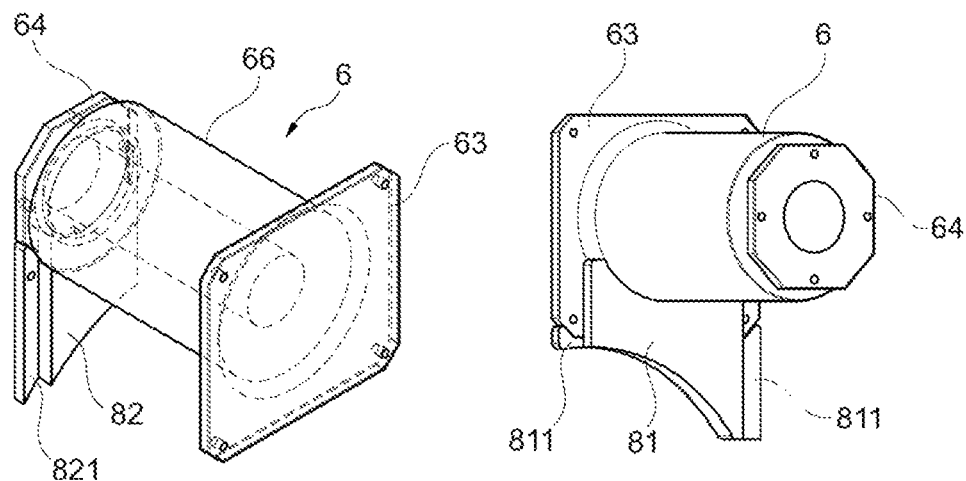
FIG. 15 shows a perspective, partially transparent illustration of the planet pin equipped with two platforms, wherein the axially rear platform is secured by means of an axially rear securing plate.
FIG. 16 shows a further perspective illustration of the planet pin equipped with two platforms, wherein the axially front platform is secured by means of an axially front securing plate.

FIG. 15 shows, in a perspective and transparent illustration, the hollow body 66, which is of hollow cylindrical form, of the planet pin 6, at the two end sides of which the platforms 63, 64 are arranged. It is pointed out at this juncture that the platforms 63, 64 are for example of polygonal, in particular square or octagonal, design. Here, the front, relatively large platform 63 is of substantially square design (with flattened corners), and the rear, relatively small platform 64, is of substantially octagonal design. This is however to be understood merely as an example.

It can also be seen from FIG. 15 that the securing plates 82 form lateral webs 821, which are provided for being pushed into the guide grooves 73, whereby the securing plates 82 are guided in the slots 72.

FIG. 16 shows, in a perspective view, the planet pin 6 with the two platforms 63, 64, with the illustration additionally showing the securing plates 81 inserted into the slot 71 in the axially front platform 341. Said securing plate 81 likewise has lateral webs 811, which are provided for being pushed into the guide grooves, whereby the securing plates 81 are guided in the slots 71.

Figure 17:
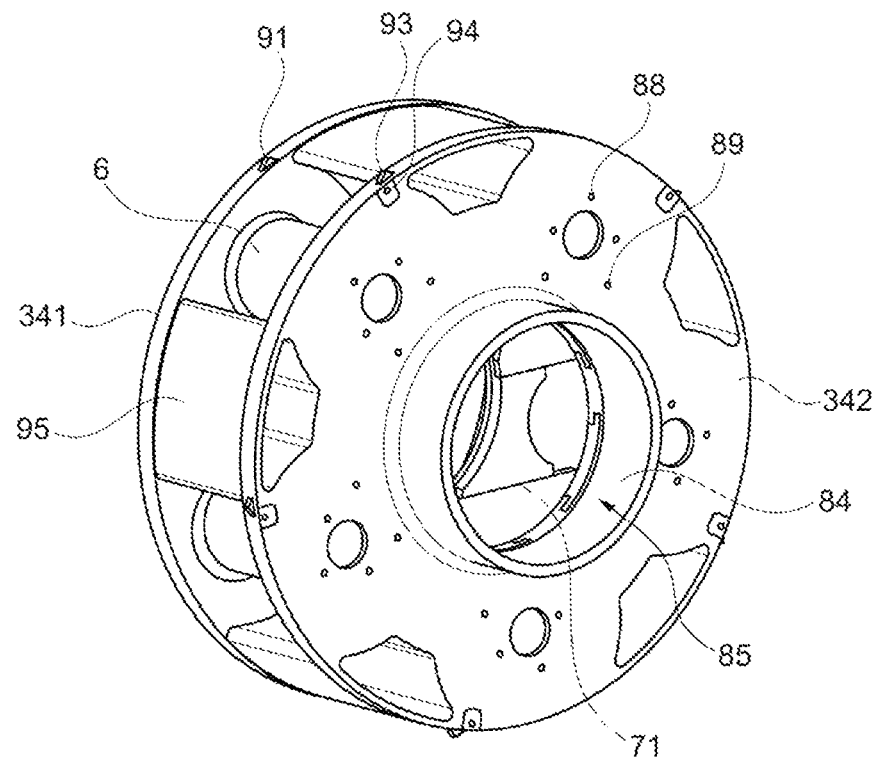
FIG. 17 shows the planetary gear box of FIGS. 5 to 16 in a first perspective illustration obliquely from the rear.
Figure 18:
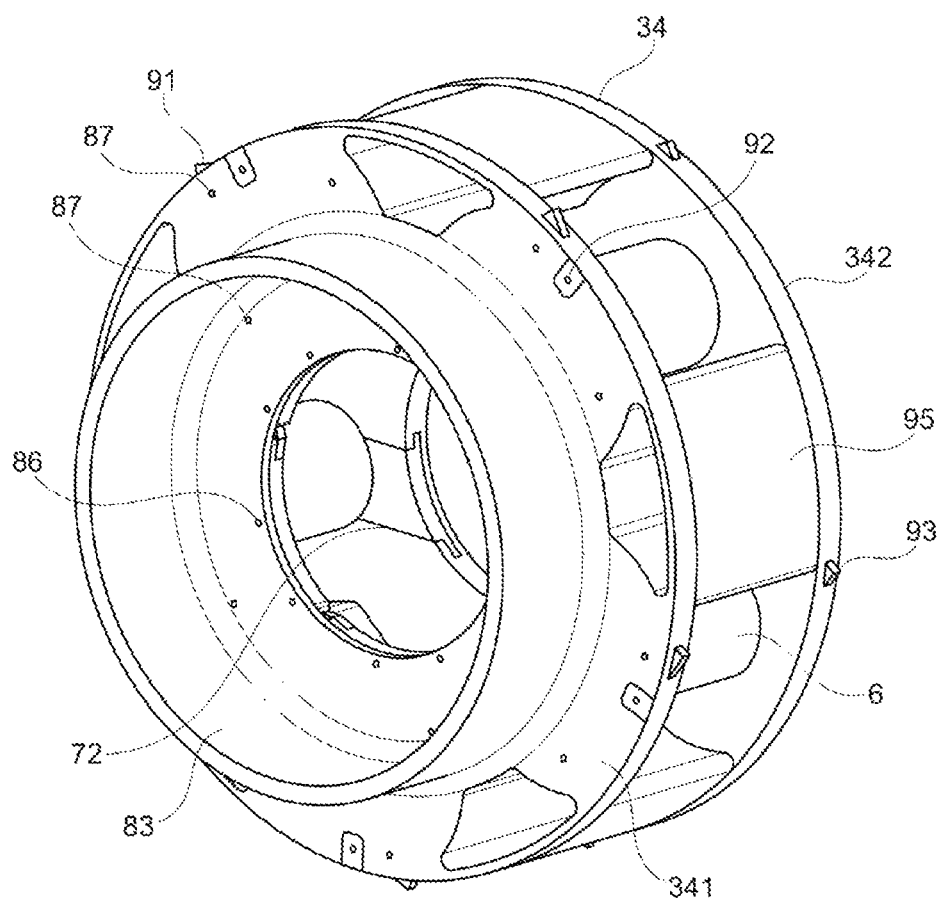
FIG. 18 shows the planetary gear box of FIGS. 5 to 16 in a second perspective illustration obliquely from the front.

FIGS. 17 and 18 show, in two perspective illustrations, the planet carrier 34 with the fully installed planet pins 6, which, with their platforms 63, 64, have been pushed in the described manner into the radially running slots 71, 72 of the axially front carrier plate 341 and of the axially rear carrier plate 342. Here, the filler elements 91, 93 have been pushed into the radial elongations of the slots 71, 72. Here, the filler elements 91, 93 are additionally each fixedly connected, by means of a fastening element 92, to the respective carrier plate 341, 342. Furthermore, the securing plates are additionally fixedly connected, by means of fastening elements 86, 89, and the platforms are additionally fixedly connected, by means of fastening elements 87, 88, to the respective carrier plate 341, 342. The fastening elements 86-89, 92 are for example screw connections or bolt connections.

Figure 19:
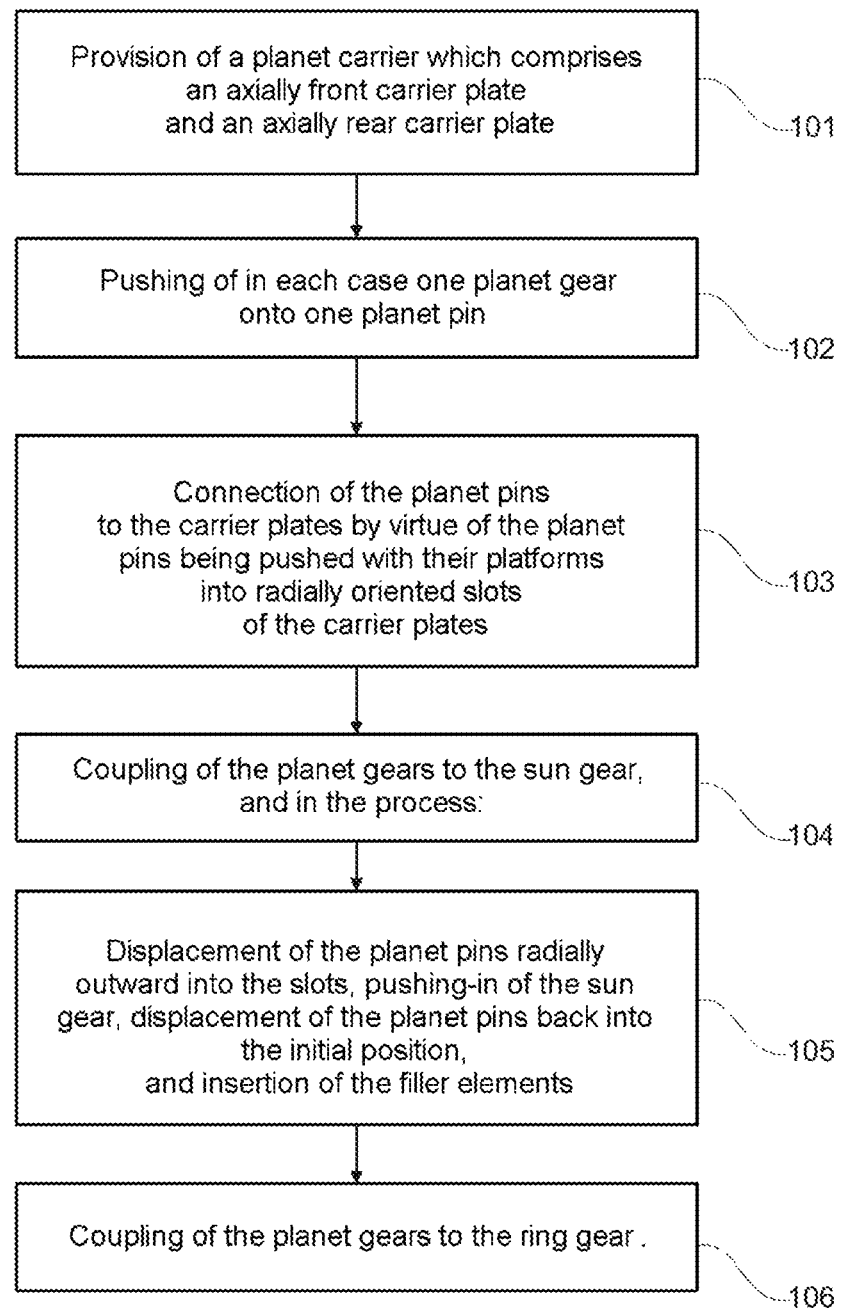
FIG. 19 shows a flow diagram of a method for the assembly of a planetary gear box.

FIG. 19 shows a flow diagram with the method steps for the assembly of a planetary gear box as per FIGS. 5 to 18. The method is distinguished by the fact that the planet gears are mounted onto the planet pins before the planet pins are fastened to the planet carrier.

Accordingly, in a first method step 101, it is firstly provided that a planet carrier is provided which comprises an axially front carrier plate and an axially rear carrier plate. Here, the planet pins have not yet been installed on the planet carrier.

In the method step 102, in each case one planet gear is pushed onto each planet pin. Only subsequently, in the method step 103, is a connection of the planet pins to the carrier plates performed. The connection is provided by virtue of the planet pins being pushed with their platforms into the radially oriented slots of the carrier plates. Here, the radially oriented slots may extend radially outward from a central cutout of the respective carrier plate, or may alternatively extend radially inward from the radially outer edge of the respective carrier plate.

Subsequently, in the method step 104, the planet gears are coupled to the sun gear. For this purpose, an optional refinement, which is expedient in the case of planet gear and sun gear being formed with a double helical toothing, provides, in the method step 105, that the planet pins are firstly displaced radially outward in the slots in which they are arranged. This is made possible by the radial elongation 77 as per FIG. 8. It is achieved in this way that the teeth of the planet carrier do not block an insertion of the sun gear. After the planet pins have been displaced radially outward, the sun gear is pushed axially into the planet carrier through the central cutout 85, see for example FIG. 7. Subsequently, the planet pins are pushed back into the initial position again. Here, the toothings of the planet gears and of the sun gear engage with one another. Subsequently, the planet pins are fixed in the carrier plates. This is realized by means of additional fastening elements such as for example screw connections, which connect the platforms to the carrier plates. Further fixing is realized by virtue of securing plates being pushed into the radially oriented slots. A filler element 91, 93 may be inserted into the radial elongation 77, correspondingly to FIGS. 11 and 12.

Subsequently, the planet gears are coupled to the ring gear, wherein the ring gear is of static form in the refinement considered here, though this is not imperative.

It will be understood that the invention is not limited to the embodiments described above, and various modifications and improvements may be made without departing from the concepts described herein. In particular, it is obvious that the planetary gear box is used only by way of example in a gas turbine engine, and may basically be used in any context for transmitting a torque.

Furthermore, except where mutually exclusive, any of the features may be used separately or in combination with any other features, and the disclosure extends to and includes all combinations and sub-combinations of one or more features that are described herein. If ranges are defined, said ranges thus comprise all of the values within said ranges as well as all of the partial ranges that lie in a range.

The invention claimed is:

1. A planetary gear box, comprising:
a sun gear which rotates about an axis of rotation of the planetary gear box,
a plurality of planet gears, which are driven by the sun gear,
a ring gear, which is in engagement with the plurality of planet gears,
a plurality of planet pins which each have a front axial end and a rear axial end, wherein the planet gears are respectively arranged on the planet pins,
an axially front carrier plate and an axially rear carrier plate, wherein the planet pins are connected to the front and rear carrier plates, each planet pin of the planet pins including at each of the front and rear axial ends, a respective platform forming a rotationally fixed constituent part of the each planet pin, the front and rear carrier plates each including radially oriented slots, and guide grooves positioned adjacent the radially oriented slots, the guide grooves configured for receiving the platforms and guiding the planet pins into the radially oriented slots, wherein the respective platforms of the each planet pin have different diameters from each other, wherein at least one of the respective platforms has a diameter smaller than a diameter of a main body of the each planet pin.

2. The planetary gear box according to claim 1, wherein the radially oriented slots on the front and rear carrier plates extend in an axial direction over only a partial thickness of the respective front and rear carrier plates.

3. The planetary gear box according to claim 1, wherein one of the respective platforms has a diameter smaller than the diameter of the main body of the each planet pin, and the other of the respective platforms has a diameter larger than the diameter of the main body of the each planet pin.

4. The planetary gear box according to claim 1, and further comprising a constriction positioned between the main body of the each planet pin and the platform which has the smaller diameter than the main body of the each planet pin, wherein portions of the platform which project radially in relation to the constriction form are arranged in respective ones of the guide grooves.

5. The planetary gear box according to claim 1, wherein each of the respective platforms is shaped as a planar plate.

6. The planetary gear box according to claim 1, wherein each of the respective platforms is shaped as a polygon.

7. The planetary gear box according to claim 1, wherein the front and rear carrier plates each have a central cutout which defines a radially inner edge of the respective front and rear carrier plate, wherein the radially oriented slots extend radially outward proceeding from the radially inner edge on the respective front and rear carrier plate.

8. The planetary gear box according to claim 1, wherein the radially oriented slots extend radially inward proceeding from radially outer edges of the front and rear carrier plates.

9. The planetary gear box according to claim 1, wherein each of the radially oriented slots has a radially inner entrance opening and a radially outer end, wherein one of the respective platforms is arranged spaced apart from the radially outer end and the each of the radially oriented slots includes a radial elongation positioned between the one of the respective platforms the radially outer end.

10. The planetary gear box according to claim 9, and further comprising a filler element positioned in the radial elongation.

11. The planetary gear box according to claim 1, and further comprising securing plates positioned respectively in the radially oriented slots which secure the respective platforms against displacement.

12. The planetary gear box according to claim 11, and further comprising fasteners connecting the securing plates to the respective front and rear carrier plates.

13. The planetary gear box according to claim 1, and further comprising fasteners connecting the respective platforms to the front and rear carrier plates.

14. The planetary gear box according to claim 1, wherein the guide grooves are formed at lateral boundaries of the radially oriented slots in the front and rear carrier plates.

15. The planetary gear box according to claim 1, wherein the main body and the respective platforms of the each planet pin are formed as a single piece.

16. A method for assembling a planetary gear box, which has:

a sun gear, a plurality of planet gears, which are driven by the sun gear, a ring gear, which is in engagement with the plurality of planet gears, a plurality of planet pins which each have a front axial end and a rear axial end and, at each of the front and rear axial ends, a respective platform which constitutes a rotationally fixed constituent part of the each of the planet pins, an axially front carrier plate and an axially rear carrier plate, each including radially oriented slots, wherein the method comprises the steps of:

providing a planet carrier which comprises the axially front carrier plate and the axially rear carrier plate, pushing the planet gears respectively onto the planet pins, subsequently connecting the planet pins to the front and rear carrier plates by pushing the planet pins with their platforms into the radially oriented slots of the front and rear carrier plates, coupling the planet gears to the sun gear, and coupling the planet gears to the ring gear, closing the radially oriented slots, after the platforms have been pushed therein, by pushing securing plates into the radially oriented after the platforms.

17. The method according to claim 16, wherein, before the coupling of the planet gears to the sun gear, displacing the planet pins radially outward from an assembled position in the radially oriented slots of the front and rear carrier plates, subsequently pushing the sun gear axially into the planet carrier via a central cutout in one of the front and rear carrier plates, and subsequently displacing the planet pins radially inward again into the assembled position, to engage respective teeth of planet gears with the sun gear.

18. A gas turbine engine for an aircraft, which has:

an engine core which comprises a turbine, a compressor and a turbine shaft connecting the turbine to the compressor and formed as a hollow shaft;

a fan, which is positioned upstream of the engine core, wherein the fan comprises a plurality of fan blades; and a planetary gear box that receives an input from the turbine shaft and outputs drive for the fan so as to drive the fan at a lower rotational speed than the turbine shaft, wherein the planetary gear box comprises:

a sun gear, which rotates about an axis of rotation of the planetary gear box and which is driven by a sun shaft, a plurality of planet gears, which are driven by the sun gear, a ring gear, which is in engagement with the plurality of planet gears, a plurality of planet pins which each have a front axial end and a rear axial end, wherein the planet gears are respectively arranged on the planet pins, an axially front carrier plate and an axially rear carrier plate, wherein the planet pins are connected to the front and rear carrier plates, each of the planet pins including two axial ends and a respective platform positioned at each of the two axial ends, the respective platform constituting a rotationally fixed constituent part of the each of the planet pins, the front and rear carrier plates each including radially oriented slots and guide grooves positioned adjacent the radially orient slots, and each of the respective platforms is positioned in respective ones of the guide grooves to position the each of the planet pins in respective ones of the radially oriented slots.

\* \* \* \* \*